W. E. WORMELL.
Shovel Plow.
No. 29,841. Patented Aug. 28, 1860.
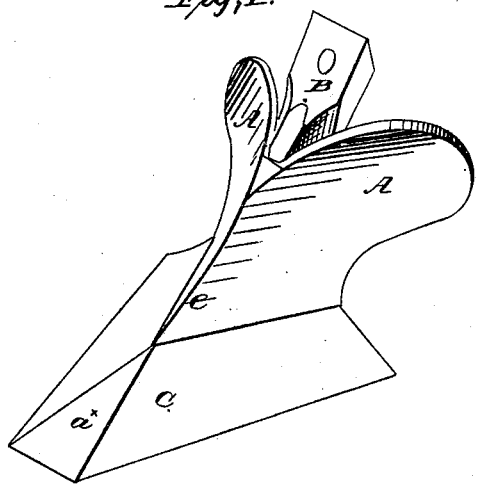
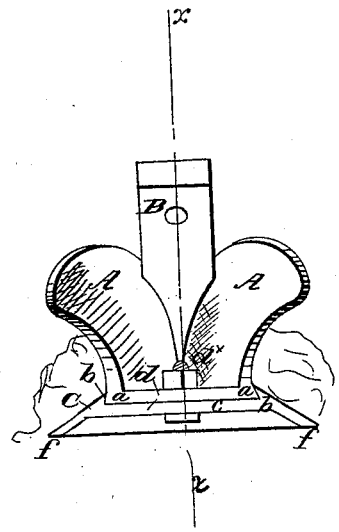
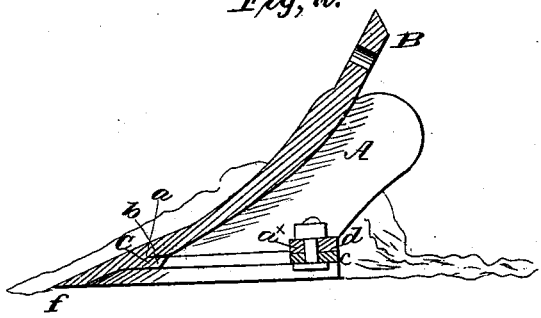
Witnesses:
Inventor:

UNITED STATES PATENT OFFICE.

W. E. WORMELL, OF GERMANTOWN, TENNESSEE.

IMPROVEMENT IN PLOWS.

Specification forming part of Letters Patent No. 29,841, dated August 28, 1860.

*To all whom it may concern:*

Be it known that I, W. E. WORMELL, of Germantown, in the county of Shelby and State of Tennessee, have invented a new and Improved Plow; and I do hereby declare that the following is a full, clear, and exact description of the same, reference being had to the annexed drawings, making a part of this specification, in which—

Figure 1 is a perspective view of my invention; Fig. 2, a longitudinal vertical section of the same, taken in the line $x\ x$, Fig. 3; Fig. 3, a back view of the same in elevation.

Similar letters of reference indicate corresponding parts in the several figures.

This invention relates to certain improvements in what are generally known as "shovel-plows," those used in the cultivation of southern crops, and designed for cultivators only—that is to say, for eradicating weeds and loosening the soil around or between growing plants without turning the soil and forming a furrow.

The object of the within-described invention is to effect a more thorough pulverization or working of the soil than hitherto with an implement of much less draft than all those of previous construction that have passed under my observation, and also to obtain a self-sharpening implement and one of greater durability.

To enable those skilled in the art to fully understand and construct my invention, I will proceed to describe it.

A A represent the mold-boards of the plow. These mold-boards are precisely the same in form and are connected at their front edges, forming what is generally known as a "double mold-board plow," as shown clearly in Figs. 1 and 3. The mold-boards are both cast in one piece, and have, as usual, a reverse position one with the other, the mold-boards curving upward and outward, as shown clearly in Fig. 1. At the upper edges of the mold-boards, at their junction, there is a standard, B, to which the handle of the plow is attached. This standard may be cast with the mold-boards. The lower edges or parts of the mold-boards A A are slightly inclined all around, as shown at $a$ in Figs. 2 and 3.

C is the share, which is also of double form corresponding to the mold-boards. The upper edge of the share is provided with a dovetail recess, $b$, to receive the lower edges of the mold-boards, as shown clearly in Figs. 2 and 3. The two sides of the share C are connected at their back ends by a cross-bar, $c$, and the back parts of the mold-boards are also connected by a cross-bar, $d$, at their lower ends. These cross-bars, when the mold-boards and share are fitted together, have a bolt, $d^*$, passing through them, which, in connection with the dovetail joint, secures firmly the share and mold-boards together. The front part of the share C is a plane trilateral surface, $a^x$, as shown plainly in Fig. 1, the lever part of the share forming a straight penetrating edge at right angles with the line of draft. This front trilateral part of the share is of course inclined, and the upper angle of said part coincides with the edge $e$, formed by the junction of the mold-boards A A. The upper parts of the mold-boards A A, as previously stated, curve upward and outward, but they do not project out farther than the back ends of the share. It is designed to have the two sides of the share C and the upper parts of the mold-boards so placed relatively with each other that the mold-boards will throw the earth down in the furrow behind the share, filling the same and leaving the earth in a light, loose state without any furrow or ridge.

The under surface of the share C is inclined, as shown plainly in Fig. 3, and its bottom edges, $f$, are horizontal, as shown plainly in Fig. 3. By this arrangement the share is rendered self-sharpening, as will readily be seen, the wearing away of the metal on the bottom $f$ keeping the angle formed by the inclined outer sides of the share and the bottom surface, $f$, always acute.

In case a new share be required the old one, in consequence of the connection, as shown, may be readily detached and a new one secured to the mold-boards.

The device is a very durable one and far superior to the ordinary shovel-plow, which is simply a shovel-shaped share placed quite angularly with the earth and dragged through it at a great expenditure of power and without thoroughly loosening the earth, it being impossible to form one furrow directly by the side of another, as the share is of taper form and a ridge of hard unloosened soil will be left between. This difficulty is fully obviated by my invention, as the share C passes over an extent of soil fully as wide as the mold-boards above it, and consequently the whole of the earth through which the implement passes will be fully pulverized.

Having thus described my invention, what I claim as new, and desire to secure by Letters Patent, is—

The arrangement of the trilateral surface $a^x$, inclined shares C, mold-boards A, and standard B, as and for the purpose herein shown and described.

W. E. WORMELL.

Witnesses:
   CHS. M. HUGHES,
   MICH. HUGHES.